(12) United States Patent
Weczerek et al.

(10) Patent No.: US 8,274,997 B2
(45) Date of Patent: Sep. 25, 2012

(54) TRANSMISSION METHOD AND RECEPTION METHOD

(75) Inventors: Juergen Weczerek, Blomberg (DE); Andreas Pape, Brakel (DE); Gunnar Lessmann, Nieheim (DE)

(73) Assignee: Phoenix Contact GmbH & Co. KG (DE)

( * ) Notice: Subject to any disclaimer, the term of this patent is extended or adjusted under 35 U.S.C. 154(b) by 79 days.

(21) Appl. No.: 12/372,243

(22) Filed: Feb. 17, 2009

(65) Prior Publication Data

US 2009/0207858 A1     Aug. 20, 2009

(30) Foreign Application Priority Data

Feb. 18, 2008 (DE) .......................... 10 2008 009 835

(51) Int. Cl.
    *H04J 3/24* (2006.01)
(52) U.S. Cl. ...................................................... 370/474
(58) Field of Classification Search .................. 370/503, 370/463, 474
See application file for complete search history.

(56) References Cited

U.S. PATENT DOCUMENTS

| | | |
|---|---|---|
| 2005/0018670 A1 | 1/2005 | Shigematsu et al. |
| 2006/0056443 A1 | 3/2006 | Tao et al. |
| 2007/0058682 A1* | 3/2007 | Albrecht et al. ............. 370/503 |
| 2007/0064737 A1 | 3/2007 | Williams |
| 2007/0242676 A1 | 10/2007 | Fridman |
| 2008/0002737 A1* | 1/2008 | Schwenkel et al. .......... 370/463 |

FOREIGN PATENT DOCUMENTS

| | | |
|---|---|---|
| DE | 10 2005 025 582 A1 | 12/2006 |
| DE | 10 2007 004 004 A1 | 7/2008 |
| EP | 1594284 A2 | 11/2005 |
| WO | 2004075026 A2 | 9/2004 |
| WO | 2007143833 A1 | 12/2007 |

OTHER PUBLICATIONS

Weigt, Hausruf, "German Patent Application No. 10 2008 009 835.3 Office Action", Sep. 23, 2008, Publisher: Deutsches Patent- und Markenamt, Published in: DE.
Guido Reeck, "EP Patent Application EP 09 00 1954 Search Report", Jun. 4, 2009, Publisher: EPO, Published in: EP.
Lorchat, J. et al., "Energy Saving in IEEE 802.11 Communications using Frame Aggregation", "Globecom '03", Dec. 1, 2003, pp. 1296-1300, vol. Kapitel I-IIII, No. ISBN: 978-0-7803-797, Publisher: IEEE Global Telecommunications Conference. Conferece Proceedings. , Published in: San Francisco, CA.
Dipl.-Ing. Weigt, Hausruf, "German Office Action for parallel case International Application No. 10 2008 009 835.3-31 dated Sep. 30, 2010", Publisher: German Patent Office, Published in: DE.
Lorchat et al, "Energy Saving in IEEE 802.11 Communications using Frame Aggregation", "Proceedings from Globecom 2003 IEEE Global Telecommunications Conference", , pp. 1296-1300, Publisher: IEEE.
Plummer, David C., "An Ethernet Address Resolution Protocol or Converting Network Protocol Addresses to 48.bit Ethernet Address for Transmis", Nov. 1982, Publisher: Network Working Group.
Gramm, Lins & Partners, "DE Application No. 10 2008 009 835 B4 Opposition Oct. 28, 2011", Published in: DE.

* cited by examiner

*Primary Examiner* — Albert T Chou
(74) *Attorney, Agent, or Firm* — Kaplan Breyer Schwarz & Ottesen, LLP

(57) ABSTRACT

The invention relates to a transmission method in which at least two Ethernet data frames are combined to form one Ethernet telegram and the Ethernet telegram is transmitted via a communications network.

12 Claims, 6 Drawing Sheets

TRANSMISSION METHOD AND RECEPTION METHOD

FIELD OF INVENTION

The present invention relates to the field of communications technology.

BACKGROUND OF THE INVENTION

Known radio systems, such as WLAN (WLAN: Wireless Local Area Network) according to the IEEE 802.11 standard and Bluetooth according to the IEEE 802.15.1 standard that permit a transparent transmission of Ethernet-based communications protocols, transmit these protocols in a highly inefficient way, because the Ethernet protocol is normally packed into a radio data packet without further optimization. Because the Ethernet packets according to the IEEE 802.3 standard must be composed of at least 64 bytes, but many automation systems transmit only a few usable data bytes in an Ethernet data frame, the ratio of usable data to protocol overhead or to the total protocol length is not favorable in Ethernet systems. This is made even worse in radio transmission, because a radio connection has a data rate even lower than that of an Ethernet system. In addition, the radio connection requires the addition of protocol overhead required for the communications, wherein transmission is further possible only in a half-duplex method. Therefore, the cycle time response of a radio-based Ethernet system is basically more disadvantageous than the time response of a wired Ethernet system such as the Profinet system.

In known radio systems, it is problematic that often only a statistical medium access is permitted. This method produces disadvantages in the time response of an automation solution through, for example, increased jitter in the communications cycles. For optimizing the time response, for example, polling-based medium access methods can be used that are standard for Bluetooth and that are approved for WLAN. Indeed, even in these systems, for each polling cycle only one data packet of an I/O subscriber is transmitted. However, if there are several I/O subscribers behind a radio connection, wherein these subscribers communicate cyclically with a controller, for example, in a permanently installed network part, then the time response of the total communications between the I/O subscribers is not always predictable. For example, in the case of the Profinet standard, more than one I/O subscriber cannot be provided behind the radio bridge in a WLAN transmission.

SUMMARY OF THE INVENTION

The problem of the present invention is to create an improved concept for Ethernet transmission, especially for Profinet systems.

According to the invention, several real-time Ethernet telegrams, for example, several real-time Profinet telegrams, can be compressed, e.g., by the removal of padding to the 64-byte telegram length, wherein several Ethernet data frames, in particular, several Profinet data frames can be combined to form a common telegram. In addition, the Medium Access Control Headers (MAC Headers) of the Ethernet frames, for example, the Profinet frames, can be greatly shortened, because the wireless components can learn the MAC addresses of the I/O and can control subscribers involved in the communications like a switch. In addition, in the case of a Profinet system this information can also be reported by the Profinet engineering tool. Here, for example, a Profinet I/O device (I/O: Input/Output) or an arbitrary management interface such as the SNMP (Simple Network Management Protocol) can be used. For this purpose, the involved devices can feature, for example, an interface conforming to Profinet. Alternatively, an arbitrary management interface can be used, such as, for example, SNMP. In this way, a Profinet telegram conforming to standards is no longer transmitted between the infrastructure components involved in the radio communications such as access points or clients. Instead, a compressed protocol is used that can be made from the individual protocols of several Profinet subscribers. Thus, if a Medium Access Control Header is removed, e.g., on the transmit side from at least one of the Ethernet data frames combined to form one telegram, this header is provided again on the receive side, e.g., by means of a management interface.

Therefore, in a simple way, both the protocol efficiency of the wireless communications can be increased and the timing problems of several I/O subscribers behind one wireless bridge, for example, can be avoided through the transmission of several Profinet telegrams within one telegram. The protocol compressed and packed together according to the invention is preferably used exclusively for radio communications. The joining or the unpacking of these telegrams is preferably performed by the respective radio components involved, so that the connection outside of the radio cell is perceived as a normal Ethernet connection or as a normal Profinet connection. The concept according to the invention can be used for all radio technologies, for example, for WLAN or for Bluetooth transmission. So that the radio connection remains transparent for the general network traffic, the mechanism according to the invention can be applied preferably to the real-time Ethernet telegrams such as Profinet telegrams with the Ethernet-type designation 0x8892.

According to one aspect, the invention relates to an Ethernet transmission method with the combination of at least two Ethernet data frames to form a combined Ethernet telegram and the transmission of the Ethernet telegram via a communications network.

According to one embodiment, the method includes the compression of the Ethernet telegram.

According to one embodiment, the combined Ethernet telegram includes padding, wherein the padding is removed for the compression of the Ethernet telegram.

According to one embodiment, each Ethernet data frame includes a Medium Access Control Header, wherein a Medium Access Control Header is removed from at least one Ethernet data frame.

According to one embodiment, the telegram is transmitted using the Ethernet protocol via a communications network.

According to one embodiment, the Ethernet transmission method is a Profinet transmission method, wherein the Ethernet data frames are Profinet data frames and wherein the Ethernet telegram is a Profinet telegram.

According to one aspect, the invention relates to an Ethernet reception method with the reception of an Ethernet telegram via a communications network and the extraction of at least two Ethernet data frames from the Ethernet telegram.

According to one embodiment, the Ethernet reception method is a Profinet transmission method, wherein the Ethernet data frames are Profinet data frames and wherein the Ethernet telegram is a Profinet telegram.

According to one aspect, the invention relates to an Ethernet transmission device with a device for the combination of at least two Ethernet data frames to form one Ethernet telegram and a transmitter for the transmission of the Ethernet telegram via a communications network.

According to one embodiment, the Ethernet transmission device includes a compressor for the compression of the Ethernet telegram.

According to one embodiment, it is a Profinet transmission device, wherein the Ethernet data frames are Profinet data frames and wherein the Ethernet telegram is a Profinet telegram.

According to one aspect, the invention relates to an Ethernet reception device with a receiver for the reception of an Ethernet telegram via a communications network and a processor for the extraction of at least two Ethernet data frames from the Ethernet telegram.

According to one embodiment, the Ethernet reception device is a Profinet reception device, wherein the Ethernet data frames are Profinet data frames and wherein the Ethernet telegram is a Profinet telegram.

According to one aspect, the invention relates to a computer program for the execution of at least one method according to the invention.

BRIEF DESCRIPTION OF THE DRAWINGS

Additional embodiments will be explained in greater detail with reference to the accompanying drawings.

DETAILED DESCRIPTION

The transmission device can further have a compressor for the compression of the Ethernet telegram, wherein the compressor removes, for example, the padding bits from the data frames or from the individual telegrams. The compressor can be further provided to use a data-compression method for the compression of the telegram. The compressor can remove one or more Medium Access Control Headers from each of the data frames to further compress the combined telegram.

Figure 1:
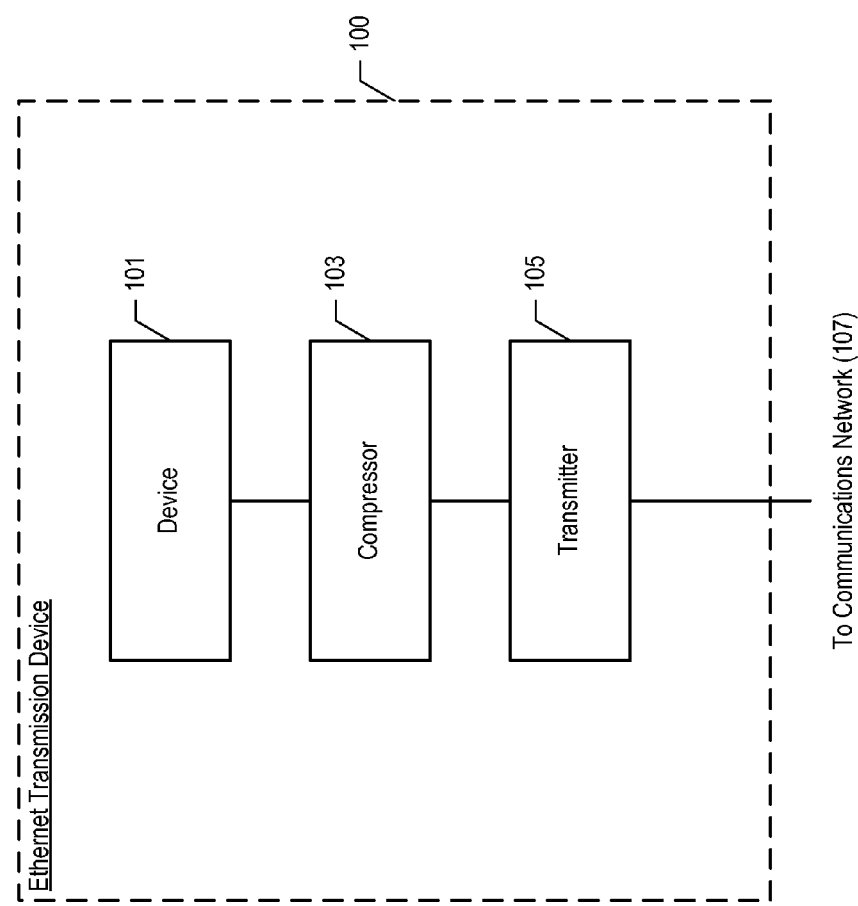
FIG. 1 shows a block diagram of an Ethernet transmission device 100.

An Ethernet reception device not shown in greater detail in FIG. 1 for the reception of an Ethernet telegram combined from at least two Ethernet data frames has, in addition to a receiver for the reception of an Ethernet telegram via a communications network, a processor for the extraction of at least two Ethernet data frames from the Ethernet telegram. If one or more Medium Access Control Headers have been removed on the transmit side from the data frames, then these headers can be provided again on the receive side, e.g., by means of a management interface.

The transmission device shown in FIG. 1 is preferably a Profinet transmission device, so that the data frames are Profinet data frames and the telegram is a Profinet telegram.

FIG. 1 shows a block diagram of an Ethernet transmission device 100 that comprises a device 101, a compressor 103, and a transmitter 105; wherein the device 101 is for the combination of at least two Ethernet data frames to form a combined Ethernet telegram, and wherein the transmitter 105 is for the transmission of the Ethernet telegram via, for example, a wireless communications network 107.

Figure 2:
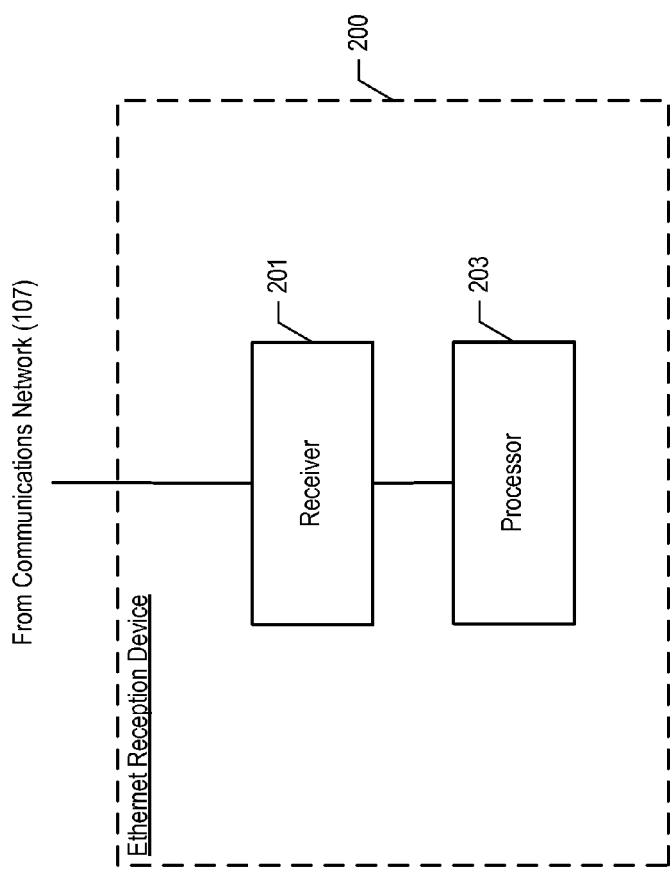
FIG. 2 shows a schematic block diagram of an Ethernet reception device 200.

FIG. 2 shows a schematic block diagram of an Ethernet reception device 200 that comprises a receiver 201 for receiving a compressed Ethernet telegram and a processor 203 for extracting at least two Ethernet data frames from the compressed Ethernet telegram.

Figure 3:
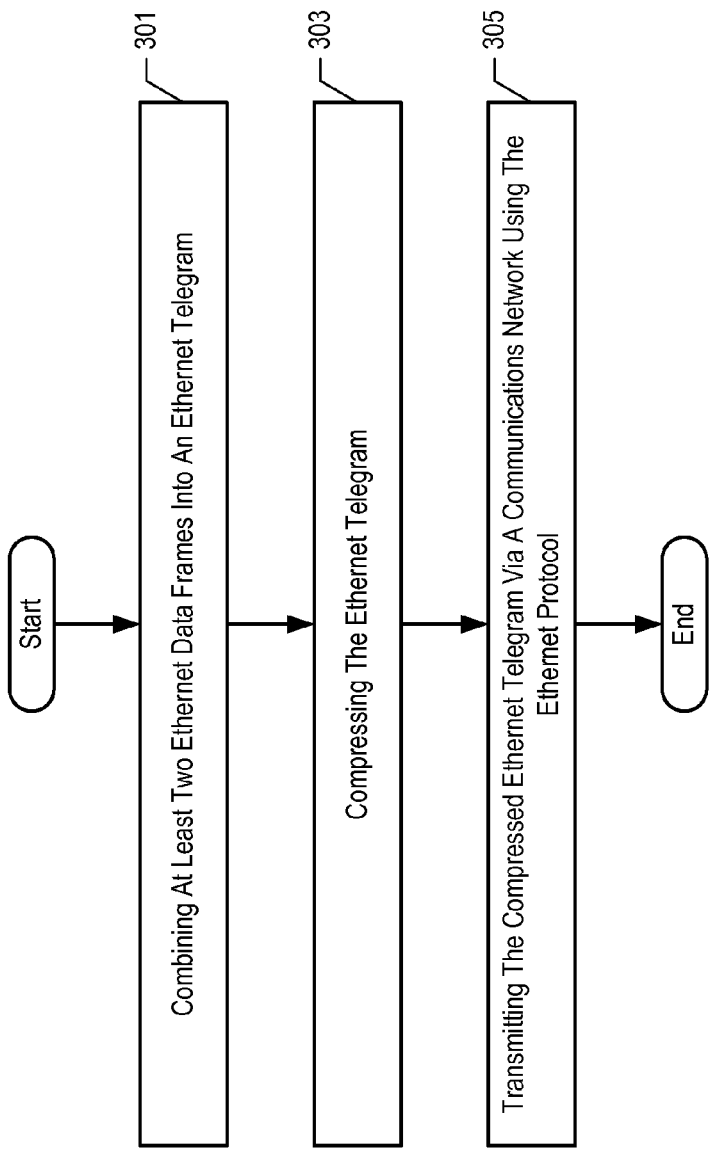
FIG. 3 shows a flowchart of the salient tasks performed by Ethernet transmission device 100.

FIG. 3 shows a flowchart of the salient tasks (i.e., tasks 301, 303, and 305) performed by Ethernet transmission device 100 in accordance with the illustrative embodiment of the present invention.

Figure 4:
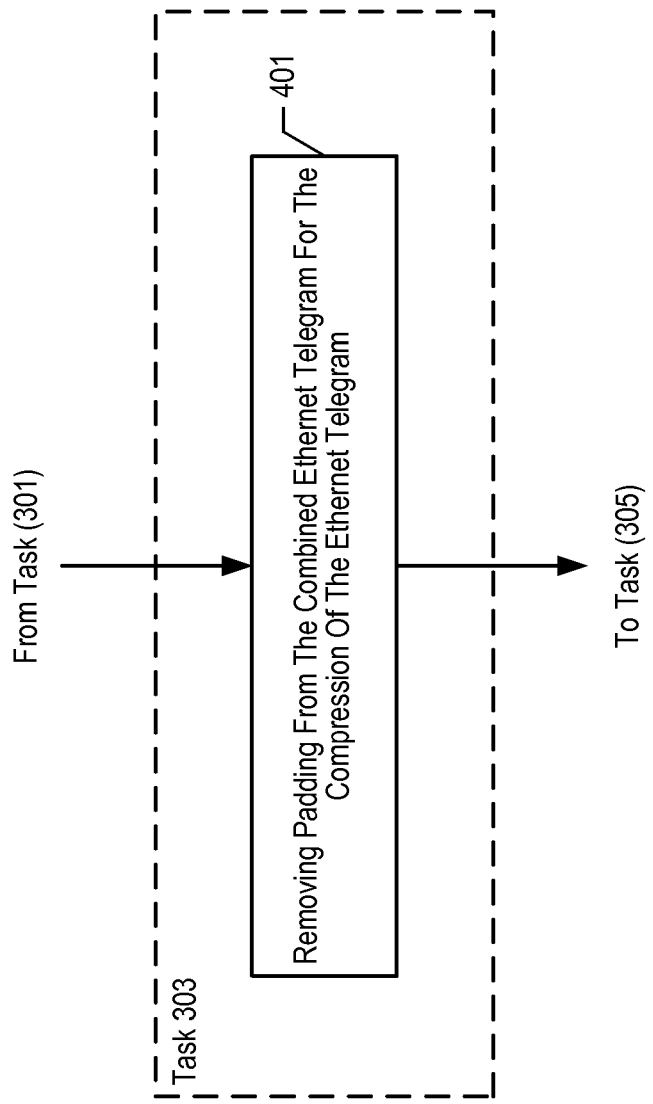
FIGS. 4 and 5 show flowcharts of subtasks associated with task 303 shown in FIG. 3, performed by Ethernet transmission device 100.

FIG. 4 shows a flowchart of the salient task (i.e., task 401) performed by Ethernet transmission device 100 for removing padding from the combined Ethernet telegram in accordance with the illustrative embodiment of the present invention.

Figure 5:
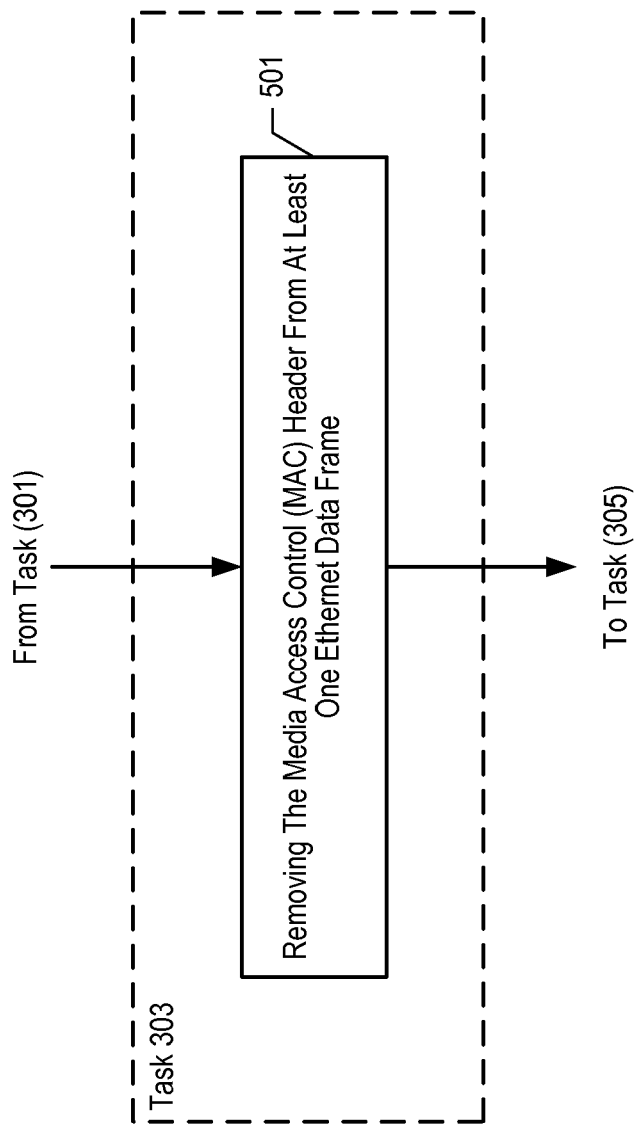

FIG. 5 shows a flowchart of the salient task (i.e., task 501) performed by Ethernet transmission device 100 for removing the Media Access Control (MAC) header from at least one Ethernet data frame in accordance with the illustrative embodiment of the present invention.

Figure 6:
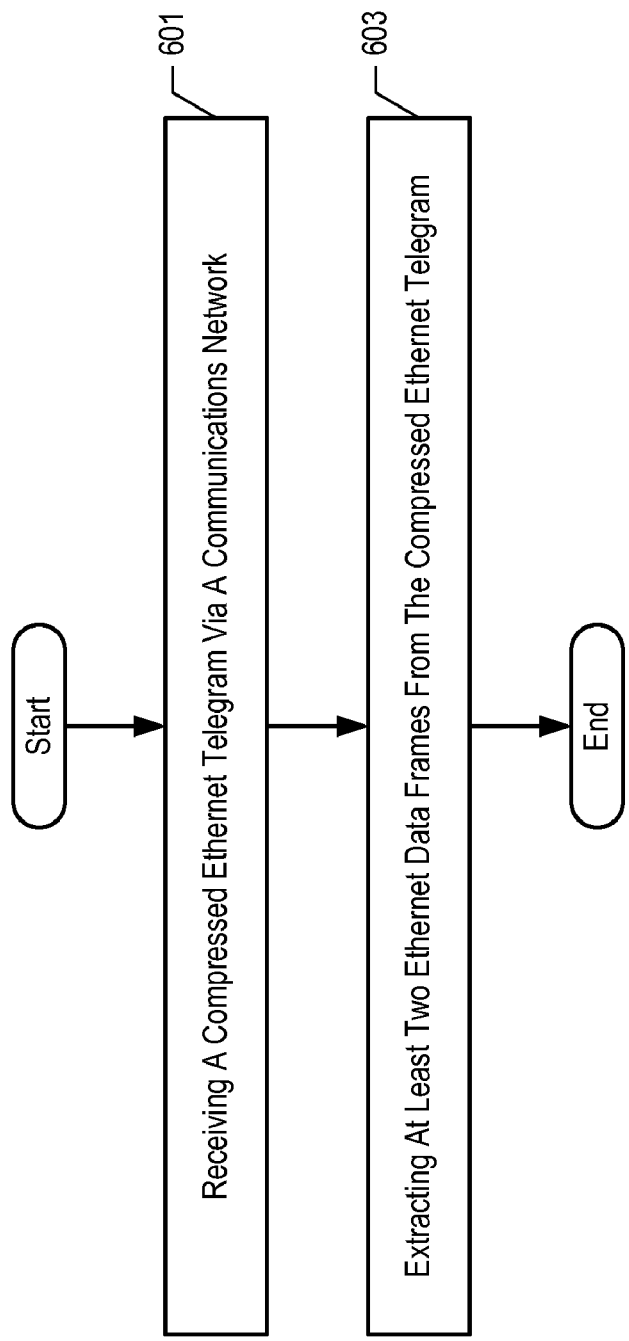
FIG. 6 shows a flowchart of the salient tasks performed by Ethernet reception device 200.

FIG. 6 shows a flowchart of the salient tasks (i.e., tasks 601 and 603) performed by Ethernet reception device 200 in accordance with the illustrative embodiment of the present invention.

What is claimed is:

1. An Ethernet transmission method comprising:
combining, by an Ethernet transmission device, at least two Ethernet data frames into an Ethernet telegram;
compressing, by the Ethernet transmission device, the Ethernet telegram; and
transmitting, by the Ethernet transmission device, the compressed Ethernet telegram via a communications network.

2. The Ethernet transmission method according to claim 1, wherein the combined Ethernet telegram contains padding and wherein the padding is removed for the compression of the Ethernet telegram.

3. The Ethernet transmission method according to claim 1, wherein each Ethernet data frame has a Medium Access Control Header and wherein a Medium Access Control Header is removed from at least one Ethernet data frame.

4. The Ethernet transmission method according to claim 1 in which the telegram is transmitted using the Ethernet protocol via the communications network.

5. The Ethernet transmission method according to claim 1 is a Profinet transmission method, wherein the Ethernet data frames are Profinet data frames and wherein the Ethernet telegram is a Profinet telegram.

6. An Ethernet reception method comprising:
receiving, by an Ethernet reception device, a compressed Ethernet telegram via a communications network transmitted according to claim 1, wherein at least two Ethernet data frames are combined into the Ethernet telegram; and
extracting, by the Ethernet reception device, the at least two Ethernet data frames from the compressed Ethernet telegram.

7. The Ethernet reception method according to claim 6, wherein the Ethernet reception method is a Profinet transmission method, wherein the Ethernet data frames are Profinet data frames, and wherein the Ethernet telegram is a Profinet telegram.

8. An Ethernet transmission device comprising:
a device for combining at least two Ethernet data frames to form one Ethernet telegram;
a compressor for compressing the Ethernet telegram; and
a transmitter for transmitting the compressed Ethernet telegram via a communications network.

9. The Ethernet transmission device according to claim 8 is a Profinet transmission device, wherein the Ethernet data frames are Profinet data frames and wherein the Ethernet telegram is a Profinet telegram.

10. An Ethernet reception device comprising:
- a receiver for receiving a compressed Ethernet telegram via a communications network transmitted by an Ethernet transmission device according to claim 8, wherein at least two Ethernet data frames are combined into the Ethernet telegram; and
- a processor for extracting the at least two Ethernet data frames from the compressed Ethernet telegram.

11. The Ethernet reception device according to claim 10 is a Profinet reception device, wherein the Ethernet data frames are Profinet data frames and wherein the Ethernet telegram is a Profinet telegram.

12. A computer-readable non-transitory medium for storing a computer program for the execution of a method according to claim 1, when the computer program runs on the Ethernet transmission device.

* * * * *